(12) United States Patent
Morgenstern et al.

(10) Patent No.: US 11,817,709 B2
(45) Date of Patent: Nov. 14, 2023

(54) METHOD FOR STABILIZING AN AC VOLTAGE GRID

(71) Applicant: Siemens Energy Global GmbH & Co. KG, Munich (DE)

(72) Inventors: Ralph Morgenstern, Erlangen (DE); Markus Naukamm, Erlangen (DE); Bjoern Hellfritzsch, Fuerth (DE); Andreas Haselbauer, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 219 days.

(21) Appl. No.: 17/464,902

(22) Filed: Sep. 2, 2021

(65) Prior Publication Data
US 2022/0069583 A1 Mar. 3, 2022

(30) Foreign Application Priority Data
Sep. 2, 2020 (EP) .................................. 20194111

(51) Int. Cl.
*H02J 3/30* (2006.01)
*H02J 3/18* (2006.01)
(52) U.S. Cl.
CPC .......... *H02J 3/1885* (2013.01); *H02J 3/1878* (2013.01); *H02J 3/30* (2013.01)

(58) Field of Classification Search
CPC .......... H02J 3/30; H02J 3/1885; H02J 3/1878
See application file for complete search history.

(56) References Cited

U.S. PATENT DOCUMENTS

| | | | | |
|---|---|---|---|---|
| 5,825,152 | A | * 10/1998 | Eriksson | H02P 25/024 318/803 |
| 2014/0218980 | A1 | * 8/2014 | Eigenbrodt | H02P 9/08 363/40 |
| 2018/0142660 | A1 | * 5/2018 | Forster | H02J 3/1885 |
| 2019/0199255 | A1 | * 6/2019 | Hu | H02J 3/18 |
| 2019/0273379 | A1 | 9/2019 | Hasler et al. | |
| 2021/0167705 | A1 | * 6/2021 | Augsburger | H02P 9/007 |

FOREIGN PATENT DOCUMENTS

| | | | |
|---|---|---|---|
| WO | WO 2018127609 A1 | 7/2018 | |
| WO | WO-2019110090 A1 * | 6/2019 | H02M 7/4835 |

* cited by examiner

*Primary Examiner* — Harry R Behm
(74) *Attorney, Agent, or Firm* — Laurence A. Greenberg; Werner H. Stemer; Ralph E. Locher

(57) ABSTRACT

A configuration for stabilizing an AC voltage grid has a rotating phase-shifter that is configured to exchange reactive power with the AC voltage grid. The configuration is distinguished by a converter which has a grid side for connection to the AC voltage grid and a machine side for connection to the phase-shifter. A method is furthermore taught for stabilizing the AC voltage grid by way of the configuration.

3 Claims, 1 Drawing Sheet

METHOD FOR STABILIZING AN AC VOLTAGE GRID

CROSS-REFERENCE TO RELATED APPLICATION

This application claims the priority, under 35 U.S.C. § 119, of European patent application EP 20194111.9, filed Sep. 2, 2020; the prior application is herewith incorporated by reference in its entirety.

BACKGROUND OF THE INVENTION

Field of the Invention

The invention relates to an arrangement for stabilizing an AC voltage grid having a rotating phase-shifter that is configured to exchange reactive power with the AC voltage grid.

Rotating phase-shifters are rotating electric machines whose rotational energy, corresponding to their high inertia, is able to be used for grid stabilization purposes. A rotating phase-shifter connected in parallel with the AC voltage grid may also serve to provide short-circuit power and, in the event of problems, to provide reactive power for voltage recovery purposes. These functionalities are becoming of increasing importance with the increasing share of renewable energies.

Nowadays, most phase-shifters that are used operate in a manner coupled to a fixed nominal frequency of the AC voltage grid (for example 50 Hz or 60 Hz), but are however also configured to exchange power with the grid in the event of a frequency change (in particular frequency drop) in the grid. Phase-shifters are usually able to provide their kinetic energy only up to a lower limit frequency. The limit frequency is around 47 Hz or 48 Hz or, in general, between 46 Hz and 49 Hz. If this is fallen below, the phase-shifter is deactivated and disconnected from the grid.

BRIEF SUMMARY OF THE INVENTION

The object of the invention is to propose an arrangement of the above type that allows improved stabilization of the AC voltage grid.

With the foregoing and other objects in view there is provided, in accordance with the invention, a configuration for stabilizing an AC voltage grid. The configuration contains a rotating phase-shifter configured to exchange reactive power with the AC voltage grid, and a converter having a grid side for connection to the AC voltage grid and a machine side for connection to the rotating phase-shifter.

The object is achieved according to the invention in the case of a generic arrangement by a converter having a grid side (or having a grid-side converter bridge) for connection to the AC voltage grid and a machine side (or having a machine-side converter bridge) for connection to the phase-shifter. The converter is appropriately configured to convert a voltage generated at the phase-shifter into a voltage (of changed frequency) that is intended to be fed into the AC voltage grid (in some cases by way of at least one transformer). The converter is additionally expediently also configured to convert a voltage at its grid side into a machine-side voltage in order to use this to feed the phase-shifter. The converter is in any case suitably an AC-to-AC converter or a frequency converter ("static frequency converter", SFC). One significant advantage of the arrangement according to the invention is the option of using the arrangement even in cases of a large frequency drop in the AC voltage grid. Specifically, using the converter, the energy of the phase-shifter is still able to be fed for example into the AC voltage grid when the frequency is below the lower limit frequency.

The arrangement is expediently configured, upon identification of a predetermined frequency drop in the AC voltage grid, to connect the phase-shifter to the AC voltage grid by way of the converter and to feed a stored (rotational) energy of the phase-shifter into the AC voltage grid in the form of active power. In order to identify the frequency drop, provision may be made for a detection device that is able to identify the frequency drop on the basis of measured frequency values in the AC voltage grid. Measured frequency values may for example to this end be compared with a predefined or predetermined frequency threshold or a limit frequency. As soon as the frequency threshold is fallen below, the infeed of the (rotational) energy of the phase-shifter in the form of active power may be initiated. At the same time, a control method is preferably provided or implemented and simultaneously makes it possible to decouple the rigid grid connection of the phase-shifter. Energy is able to be fed into the AC voltage grid almost until the machine is at a standstill. Energy able to be fed in is defined in accordance with the design point of the SFC. A possible energy contribution is able to be estimated as follows on the basis of one exemplary design. Stored kinetic energy; 4000 MWs; SFC power: 10 MW. Duration of the energy able to be output: 4000 MWs/10 MW=400 s. After taking losses in consideration, it is accordingly possible to assume a time interval of around 350 s for which the phase-shifter may be available as an "energy source". By virtue of the expanded function of the phase-shifter, the system does not have to be jettisoned and turned off in the event of a grid fault (low frequency), but rather advantageously outputs the stored remaining kinetic energy into the grid, specifically by switching to SFC feedback mode, in particular until approaching a standstill. The proposed technical solution results in a contribution to the reserve energy and thus in a further grid stabilization contribution of the system and an additional business model for system operators.

The arrangement expediently furthermore contains a regulation device that is configured to regulate the frequency of the converter so as to control the infeed of active power when the phase-shifter is connected to the AC voltage grid via the converter. The frequency regulation may be performed by way of an appropriate regulation device.

According to one embodiment of the invention, the phase-shifter contains a synchronous machine. By way of example, the arrangement may comprise a horizontal synchronous generator that is connected to the AC voltage grid via a step-up transformer (main transformer). The synchronous machine or the synchronous generator may be started up and stopped by a frequency-regulated electric motor (pony motor) or a starter frequency converter. Upon reaching the synchronous operating rotational speed, the synchronous generator is synchronized with the AC voltage grid. The synchronous machine then provides reactive power and short-circuit power for the AC voltage grid in motor mode.

The converter is appropriately a line-commutated converter, preferably a thyristor-based converter. The thyristor-based converter comprises thyristor bridges connected on the DC-voltage side, for example 6-pulse or 12-pulse bridges. Each of the bridges contains converter arms that have single circuits or series circuits of thyristors. Such a converter is relatively robust and inexpensive. It may appropriately be designed for an operating voltage of up to or more than 10 kV. It is however also conceivable to use other types of converter. By way of example, self-commutated converters, such as for example matrix converters, may be used in the present arrangement.

The converter is expediently not connected to the phase-shifter during normal operation of the arrangement, or the connection between the phase-shifter and the converter is disconnected during normal operation of the arrangement, for example by way of an appropriate switching device. The converter is accordingly able to be activated in relation to the phase-shifter and is activated in the above-described case of the frequency drop.

The arrangement preferably contains a main transformer that is able to be connected or is connected, during operation of the arrangement, to the AC voltage grid on the grid side, and is able to be connected to a switching device and, by switching on the switching device, to the phase-shifter on the secondary side. The main transformer is furthermore able to be connected or is connected to the grid side of the converter on the secondary side. The voltage, generated on the grid side, at the converter is able to be transformed to a higher voltage, for example a voltage of more than 100 kV, preferably at least 400 kV, by way of the main transformer.

The invention furthermore relates to a method for stabilizing an AC voltage grid in which provision is made for a rotating phase-shifter that exchanges reactive power with the AC voltage grid during normal operation.

The object of the invention is to specify such a method that is as effective as possible.

The object is achieved, in the case of a generic method, according to the invention in that, upon identification of a predetermined frequency drop in the AC voltage grid, the phase-shifter is connected to the AC voltage grid by way of a converter and stored energy of the phase-shifter is fed into the AC voltage grid in the form of active power by way of the converter.

The advantages of the method according to the invention correspond in particular to the advantages that have been described in connection with the arrangement according to the invention.

Frequency regulation is preferably performed at the converter so as to control the infeed of active power. The frequency regulation may be performed by way of a regulation device. In the frequency regulation, a measured frequency actual value may be compared with a frequency setpoint value (for example nominal frequency of the AC voltage grid) and a corresponding frequency difference may be calculated. A converter current may be set depending on the frequency difference.

According to one embodiment of the invention, upon identification of the frequency drop, the phase-shifter is disconnected from the AC voltage grid by opening a switching device (for example a generator-side medium-voltage switch). The phase-shifter is instead connected to the AC voltage grid via the converter by closing an input switch between the phase-shifter and the converter. The operating sequence may for example run as follows: An underfrequency in the AC voltage grid is established by way of an appropriate grid state acquisition device or frequency detection device. A medium-voltage switch for connecting the phase-shifter to the AC voltage grid is disconnected and the phase-shifter or a synchronous machine of the phase-shifter is decoupled from the AC voltage grid. The converter is switched on and the input switch is switched on. Excitation of the phase-shifter is stepped up. Frequency regulation of the converter is started.

A converter voltage generated on the grid side is appropriately stepped up by way of a main transformer that is arranged between the converter and the AC voltage grid.

In the event of the nominal frequency recovering, the phase-shifter may be started up again (with regulated SFC in order not to additionally load the grid in the case of weak grids). In the case of very weak grids, the startup of a phase-shifter may furthermore be supported by another assistive phase-shifter (by regulating the start-up power).

Other features which are considered as characteristic for the invention are set forth in the appended claims.

Although the invention is illustrated and described herein as embodied in an assembly and a method for stabilizing an ac voltage grid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
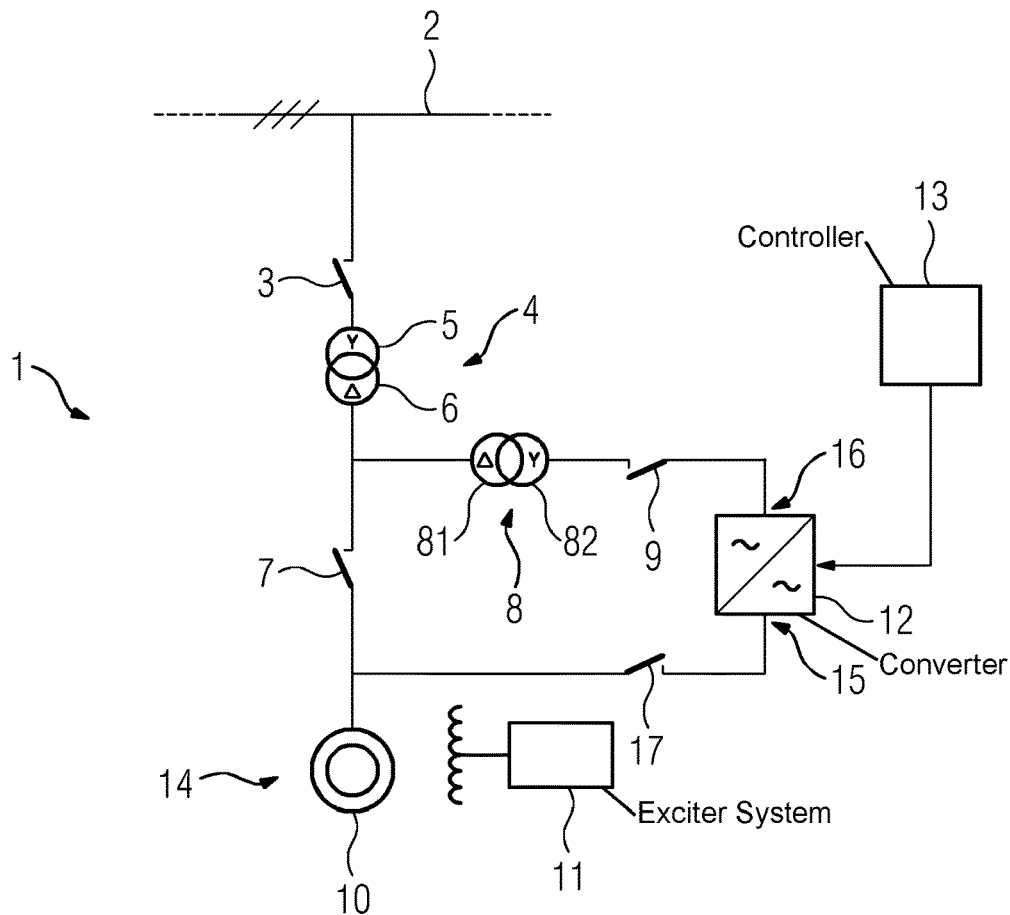
FIG. 1 is a schematic illustration of an exemplary embodiment of an arrangement according to the invention.

Referring now to the figures of the drawings in detail and first, particularly to FIG. 1 thereof, there is shown an arrangement 1 for stabilizing an AC voltage grid 2. The AC voltage grid 2 is a three-phase distribution grid with a nominal voltage of 400 kV and a nominal frequency of 50 Hz. The arrangement 1 contains a rotating phase-shifter 14 having a synchronous machine 10 (synchronous generator) and an exciter system 11. The phase-shifter 14 is connected to a secondary side 6 of a main transformer 4 ("step-up transformer") by way of a generator-side switching device 7. A primary side 5 of the main transformer 4 is able to be connected to the AC voltage grid 2 by way of a further switching device 3.

The arrangement 1 furthermore comprises a thyristor-based converter 12 having a machine side 15 for connection to the phase-shifter 14 and having a grid side 16 for connection to the main transformer 4. The connection to the main transformer 4 may be implemented by way of a further transformer 8 having a primary winding 81 and secondary winding 82 and a power switch 9. The converter 12 is able to be connected to the phase-shifter 14 by way of an input switch 17.

A control and regulation device 13 is configured to regulate (in particular regulate the frequency of) the converter 12.

Figure 2:
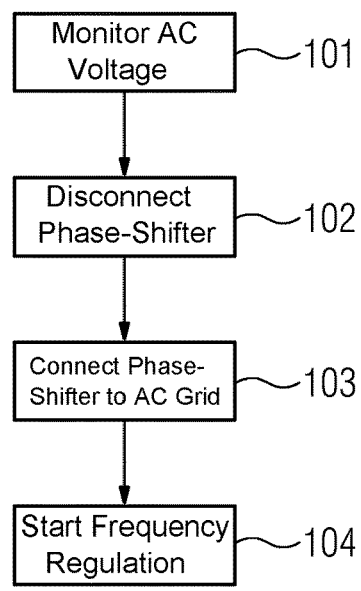
FIG. 2 is a schematic flowchart of an exemplary embodiment of a method according to the invention.

The process during operation of the arrangement according to FIG. 1 is illustrated in FIG. 2.

In a first step 101, the phase-shifter 14 is connected to the AC voltage grid 2 for normal operation and reactive power is exchanged between the phase-shifter 14 and the AC voltage grid 2. The frequency in the AC voltage grid 2 is monitored.

Upon identification of a frequency drop, that is to say a frequency in the AC voltage grid 2 below a frequency threshold (for example below 47 Hz), in a second step 102, the phase-shifter is disconnected from the AC voltage grid by opening the switching device 7.

In a third step 103, the phase-shifter 14 is instead connected to the AC voltage grid 2 via the converter 12 by closing the input switch 17 disposed in the AC voltage grid.

In a fourth step 104, frequency regulation of the converter 12 is started, and residual energy of the phase-shifter 14 begins to be fed into the AC voltage grid 2 in the form of active power.

The invention claimed is:

1. A method for stabilizing an AC voltage grid, which comprises the steps of:
    providing a rotating phase-shifter that exchanges reactive power with the AC voltage grid during normal operation;
    connecting the rotating phase-shifter to the AC voltage grid by way of a converter upon identification of a predetermined frequency drop in the AC voltage grid;
    disconnecting the rotating phase-shifter from the AC voltage grid, upon identification of a frequency drop, by opening a switch and instead connecting the rotating phase-shifter to the AC voltage grid via the converter by further closing an input switch between the rotating phase-shifter and the converter; and
    feeding stored energy of the rotating phase-shifter into the AC voltage grid in a form of active power.

2. The method according to claim 1, which further comprises performing frequency regulation at the converter so as to control an infeed of the active power.

3. The method according to claim 1, which further comprises stepping up a converter voltage generated on a grid side by way of a main transformer that is disposed between the converter and the AC voltage grid.

\* \* \* \* \*